(12) United States Patent
Xiang et al.

(10) Patent No.: US 11,579,786 B2
(45) Date of Patent: Feb. 14, 2023

(54) ARCHITECTURE UTILIZING A MIDDLE MAP BETWEEN LOGICAL TO PHYSICAL ADDRESS MAPPING TO SUPPORT METADATA UPDATES FOR DYNAMIC BLOCK RELOCATION

(71) Applicant: VMware, Inc., Palo Alto, CA (US)

(72) Inventors: Enning Xiang, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/239,025

(22) Filed: Apr. 23, 2021

(65) Prior Publication Data

US 2022/0342543 A1 Oct. 27, 2022

(51) Int. Cl.
*G06F 3/06* (2006.01)
*G06F 12/02* (2006.01)

(52) U.S. Cl.
CPC ............ *G06F 3/064* (2013.01); *G06F 3/0608* (2013.01); *G06F 3/0647* (2013.01); *G06F 3/0659* (2013.01); *G06F 3/0679* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| 6,038,639 | A | 3/2000 | O'Brien et al. |
| 8,452,819 | B1* | 5/2013 | Sorenson, III ........ G06F 3/0665 |
| | | | 707/809 |
| 2012/0239855 | A1* | 9/2012 | Tootoonchian ..... G06F 12/0246 |
| | | | 711/E12.001 |
| 2012/0317377 | A1* | 12/2012 | Palay .................. G06F 12/0246 |
| | | | 711/E12.001 |
| 2018/0039422 | A1 | 2/2018 | Li |
| 2018/0275873 | A1* | 9/2018 | Frid ........................ G06F 3/064 |
| 2019/0188124 | A1* | 6/2019 | Ferrante ............. G06F 12/0246 |
| 2020/0349032 | A1 | 11/2020 | Nanda et al. |

* cited by examiner

*Primary Examiner* — Michael Alsip
(74) *Attorney, Agent, or Firm* — Dinsmore & Shohl LLP

(57) ABSTRACT

A method for block addressing is provided. The method includes moving content of a data block referenced by a logical block address (LBA) from a first physical block corresponding to a first physical block address (PBA) to a second physical block corresponding to a second PBA, wherein prior to the moving a logical map maps the LBA to a middle block address (MBA) and a middle map maps the MBA to the first PBA and in response to the moving, updating the middle map to map the MBA to the second PBA instead of the first PBA.

14 Claims, 5 Drawing Sheets

FIGURE 3

ARCHITECTURE UTILIZING A MIDDLE MAP BETWEEN LOGICAL TO PHYSICAL ADDRESS MAPPING TO SUPPORT METADATA UPDATES FOR DYNAMIC BLOCK RELOCATION

BACKGROUND

In the field of data storage, a storage area network (SAN) is a dedicated, independent high-speed network that interconnects and delivers shared pools of storage devices to multiple servers. A virtual SAN (vSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The vSAN architecture may be a two-tier datastore including a performance tier for the purpose of read caching and write buffering and a capacity tier for persistent storage.

The vSAN datastore may manage storage of virtual disks at a block granularity. For example, vSAN may be divided into a number of physical blocks (e.g., 4096 bytes or "4K" size blocks), each physical block having a corresponding physical block address (PBA) that indexes the physical block in storage. Physical blocks of the vSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the vSAN, such that there may or may not be a one to one correspondence between a physical block in vSAN and a data block referenced by a logical block address.

Each host may include a storage management module (referred to herein as a "vSAN module") to handle input/output (I/O) write or read requests of data blocks in the vSAN. For example, an I/O request to write a block of data may be received by the vSAN module, and through a distributed object manager (DOM) sub-module (e.g., zDOM sub-module) of the vSAN module, the data may be stored in a physical memory (e.g., a bank) and a data log of the vSAN's performance tier first, the data log being stored over a number of physical blocks. Once the size of the stored data in the bank reaches a threshold size, the data stored in the bank may be flushed to the capacity tier of the vSAN.

To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance.

Segment cleaning may be introduced to provide clean and filled segments for the full stripe write. Because some solid-state storage devices (SSDs) of the vSAN may only allow write after erase operations (e.g., program/erase (P/E) cycles) and may not permit re-write operations, a number of active blocks of a stripe (e.g., segment) may be decreased. For example, for an overwrite (e.g., a write for a data block referenced by an LBA that previously had written data associated with the LBA), new physical blocks may be allocated to place new payload data associated with this LBA, and the physical blocks of the old payload data associated with this LBA may be marked as "stale" or "invalid" and recycled by garbage collection (e.g., removal of redundant data that has been overwritten but that still occupies physical space within the memory).

Segment cleaning may include both the identification of valid block(s) and the consolidation of valid block(s). Specifically, to perform segment cleaning, the zDOM sub-module may read all active blocks (e.g., valid blocks/blocks not overwritten) from one or more old segments and consolidate those active blocks to one or more new segments, to thereby free-up (i.e., "clean") the old segment and fill a new segment for full stripe writes to the capacity tier of vSAN. New data blocks may be written sequentially to the old (now clean) segment.

While segment cleaning may avoid write amplification (e.g., an undesirable phenomenon where the actual amount of information physically-written to the capacity tier is a multiple of the logical amount intended to be written) when flushing data from the in-memory bank to the capacity tier of vSAN, this may introduce severe I/O overhead when active blocks are referenced by multiple LBAs, which may be prevalent in snapshot mapping architectures.

Modern storage platforms, including vSAN datastore, may enable snapshot features for backup, archival, or data protections purposes. Snapshots provide the ability to capture a point-in-time state and data of a VM to not only allow data to be recovered in the event of failure but restored to known working points. Snapshots are not stored as physical copies of data blocks, but rather as pointers to the data blocks that existed when the snapshot was created.

Each snapshot may include its own mapping of LBAs mapped to PBAs directly. Thus, when an active block moves (e.g., is written) to a physical address as a result of segment cleaning for full stripe write, multiple LBAs pointing to this same PBA may need to be updated at different snapshot logical maps. Numerous metadata write I/Os at the snapshot logical maps may result in poor snapshot performance at the vSAN.

It should be noted that the information included in the Background section herein is simply meant to provide a reference for the discussion of certain embodiments in the Detailed Description. None of the information included in this Background should be considered as an admission of prior art.

BRIEF DESCRIPTION OF THE DRAWINGS

FIG. 3 is a diagram illustrating example segment cleaning used to consolidate active data blocks for full stripe writes, according to an example embodiment of the present disclosure.

DETAILED DESCRIPTION

Aspects of the present disclosure introduce a two-layer data block (e.g., snapshot extent) mapping architecture, where an extent is a specific number of contiguous data blocks allocated for storing information. Though certain aspects are described with respect to snapshot extents, they may be applicable to any data, data blocks, etc. In the mapping architecture, a middle map is included, such as to address the problem of input/output (I/O) overhead when dynamically relocating physical data blocks for full stripe writes. Instead of a logical block address (LBA) of a data block (e.g., of a snapshot extent) being mapped directly to a physical block address (PBA), the architecture described herein maps LBA(s) of data block(s) to a middle block address (MBA) of the middle map and the MBA maps to the PBA. With the help of the middle map, the system may not need to update multiple extents with LBAs that reference the same PBA, such as extents at different snapshot logical maps. Instead, only the PBA for the MBA in a single extent at the middle map may be updated to update the PBA for the multiple LBAs referencing the MBA.

Figure 1:
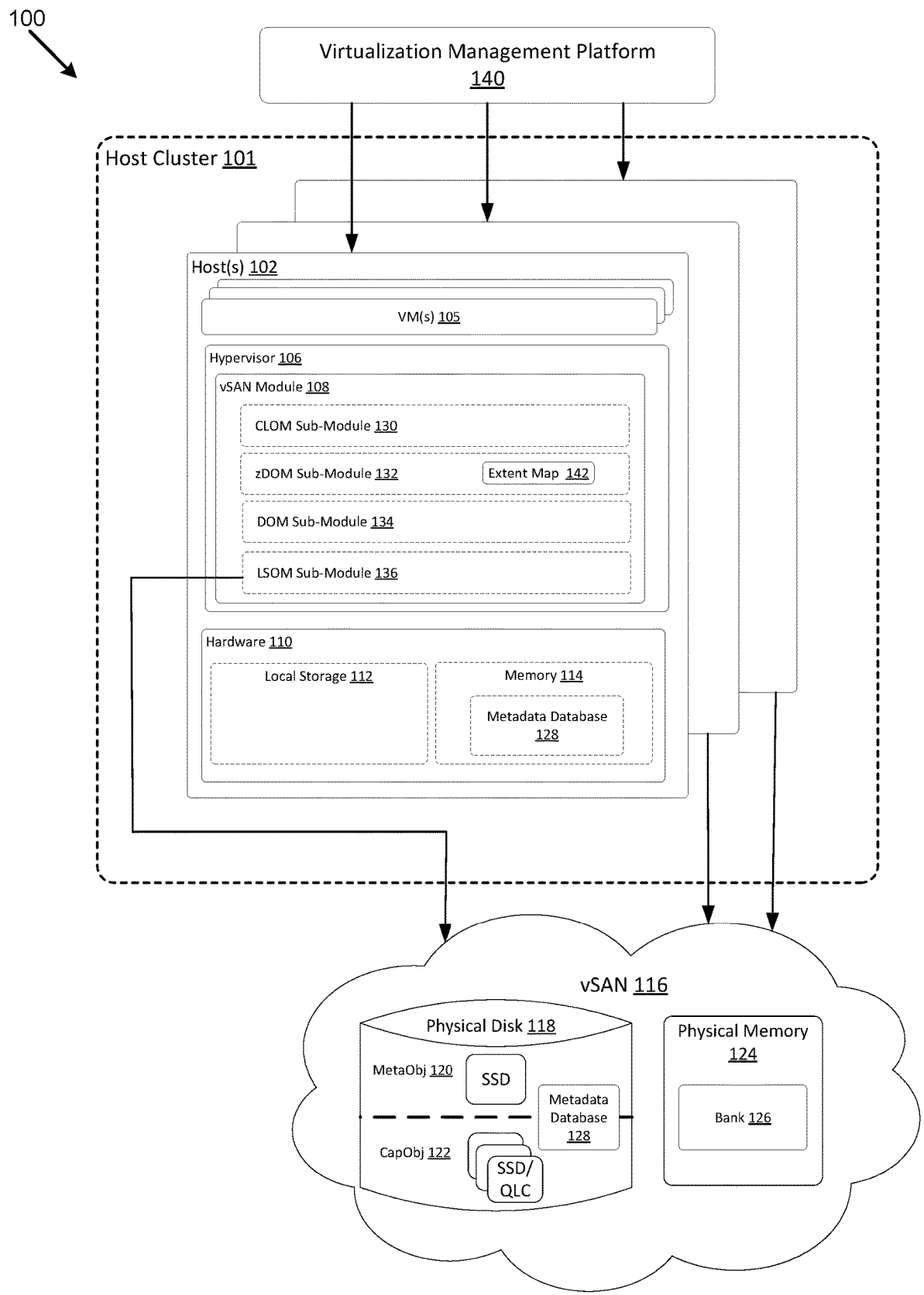
FIG. 1 is a diagram illustrating an example computing environment in which embodiments of the present application may be practiced.

FIG. 1 is a diagram illustrating an example computing environment 100 in which embodiments may be practiced. As shown, computing environment 100 may include a distributed object-based datastore, such as a software-based "virtual storage area network" (vSAN) environment 116 that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of vSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, vSAN 116 is configured to store virtual disks of VMs 105 as data blocks in a number of physical blocks each having a PBA that indexes the physical block in storage. vSAN module 116 may create an "object" for a specified data block by backing it with physical storage resources of a physical disk 118 (e.g., based on a defined policy).

vSAN 116 may be a two-tier datastore, thereby storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. Accordingly, SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data. Write bandwidth in a QLC type of storage may be substantially lower than the read bandwidth (e.g., 400 MB/s to 2200 MB/s), and a QLC storage may be randomly written with 64 KB, or even 128 KB write without causing write amplifications, as described in more detail below. These attributes make QLC storages a very desirable candidate for writes which require a big volume of data being written to the storage at once.

As further discussed below, each host 102 may include a storage management module (referred to herein as a VSAN module 108) in order to automate storage management workflows (e.g., create objects in the MetaObj 120 and CapObj 122 of vSAN 116, etc.) and provide access to objects (e.g., handle I/O operations to objects in MetaObj 120 and CapObj 122 of vSAN 116, etc.) based on predefined storage policies specified for objects in the physical disk 118. For example, because a VM 105 may be initially configured by an administrator to have specific storage requirements for its "virtual disk" depending on its intended use (e.g., capacity, availability, I/O operations per second (IOPS), etc.), the administrator may define a storage profile or policy for each VM specifying such availability, capacity, IOPS and the like.

A virtualization management platform 140 is associated with host cluster 101. Virtualization management platform 140 enables an administrator to manage the configuration and spawning of VMs 105 on the various hosts 102. As illustrated in FIG. 1, each host 102 includes a virtualization layer or hypervisor 106, a vSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Furthermore, as described below, each hypervisor 106, through its corresponding vSAN module 108, provides access to storage resources located in hardware 110 (e.g., storage) for use as storage for virtual disks (or portions thereof) and other related files that may be accessed by any VM 105 residing in any of hosts 102 in host cluster 101.

In one embodiment, vSAN module 108 may be implemented as a "vSAN" device driver within hypervisor 106. In such an embodiment, vSAN module 108 may provide access to a conceptual "vSAN" through which an administrator can create a number of top-level "device" or namespace objects that are backed by the physical disk 118 of vSAN 116. By accessing application programming interfaces (APIs) exposed by vSAN module 108, hypervisor 106 may determine all the top-level file system objects (or other types of top-level device objects) currently residing in vSAN 116.

A file system object may, itself, provide access to a number of virtual disk descriptor files accessible by VMs 105 running in host cluster 101. These virtual disk descriptor files may contain references to virtual disk "objects" that contain the actual data for the virtual disk and are separately backed by physical disk 118. A virtual disk object may itself be a hierarchical, "composite" object that is further composed of "component" objects that reflect the storage requirements (e.g., capacity, availability, IOPs, etc.) of a corresponding storage profile or policy generated by the administrator when initially creating the virtual disk. Each vSAN module 108 (through a cluster level object management or "CLOM" sub-module 130) may communicate with other vSAN modules 108 of other hosts 102 to create and maintain an in-memory metadata database 128 (e.g., maintained separately but in synchronized fashion in the memory 114 of each host 102) that may contain metadata describing the locations, configurations, policies and relationships among the various objects stored in vSAN 116. Specifically, in-memory metadata database 128 may serve as a directory service that maintains a physical inventory of the vSAN 116 environment, such as the various hosts 102, the storage resources in hosts 102 (SSD, NVMe drives, magnetic disks, etc.) housed therein and the characteristics/capabilities thereof, the current state of hosts 102 and their corresponding storage resources, network paths among hosts 102, and the like. The in-memory metadata database 128 may further provide a catalog of metadata for objects stored in MetaObj 120 and CapObj 122 of vSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by vSAN module 108 on host 102, for example, when a user (e.g., an administrator) first creates a virtual disk for VM 105 as well as when the VM 105 is running and performing I/O operations (e.g., read or write) on the virtual disk.

vSAN module 108, by querying its local copy of in-memory metadata database 128, may be able to identify a particular file system object (e.g., a VMFS file system object) stored in physical disk 118 that may store a descriptor file for the virtual disk. The descriptor file may include a reference to virtual disk object that is separately stored in physical disk 118 of vSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by vSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host machine 102.

Various sub-modules of vSAN module 108, including, in some embodiments, CLOM sub-module 130, distributed object manager (DOM) 134, zDOM 132, and/or local storage object manager (LSOM) 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in physical disk 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. In some cases, the storage policy may define attributes such as a failure tolerance, which defines the number of host and device failures that a VM can tolerate. In some embodiments, a redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of vSAN datastore 116. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). In some cases, including RAID 5 and RAID 6 configurations, each stripe may also include one or more parity blocks. Accordingly, CLOM sub-module 130, in one embodiment, may be responsible for generating a virtual disk blueprint describing a RAID configuration.

CLOM sub-module 130 may communicate the blueprint to its corresponding DOM sub-module 134, for example, through zDOM sub-module 132. The DOM sub-module 134 may interact with objects in vSAN 116 to implement the blueprint by, for example, allocating or otherwise mapping component objects of the virtual disk object to physical storage locations within various hosts 102 of host cluster 101. DOM sub-module 134 may also access the in-memory metadata database 128 to determine the hosts 102 that store the component objects of a corresponding virtual disk object and the paths by which those hosts 102 are reachable in order to satisfy the I/O operation. In some embodiments, some or all of the metadata database 128 (e.g., the mapping of the object to physical storage locations, etc.) may be stored with the virtual disk object in physical disk 118.

When handling an I/O operation from VM 105, due to the hierarchical nature of virtual disk objects in certain embodiments, DOM sub-module 134 may need to further communicate across the network (e.g., local area network (LAN), or WAN) with a different DOM sub-module 134 in a second host 102 (or hosts 102) that serves as the coordinator for the particular virtual disk object that is stored in the local storage 112 of the second host 102 (or hosts 102) and which is the portion of the virtual disk that is subject to the I/O operation. If the VM 105 issuing the I/O operation resides on a host 102 that is also different from the coordinator of the virtual disk object, the DOM sub-module 134 of the host 102 running the VM 105 may also have to communicate across the network (e.g., LAN or WAN) with the DOM sub-module 134 of the coordinator. DOM sub-modules 134 may also similarly communicate amongst one another during object creation (and/or modification).

Each DOM sub-module 134 may need to create their respective objects, allocate local storage 112 to such objects (if needed), and advertise their objects in order to update in-memory metadata database 128 with metadata regarding the object. In order to perform such operations, DOM sub-module 134 may interact with a local storage object manager (LSOM) sub-module 136 that serves as the component in vSAN module 116 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM module 132 may be responsible for caching received data in the performance tier of vSAN 116 (e.g., as a virtual disk object in MetaObj 120) and writing the cached data as full stripes on one or more disks (e.g., as virtual disk objects in CapObj 122). zDOM sub-module 132 may do this full stripe writing to minimize a write amplification effect. Write amplification, refers to the phenomenon that occurs in, for example, SSDs, in which the amount of data written to the memory device is greater than the amount of information you requested to be stored by host 102. Write amplification may differ in different types of writes. For example, in a small partial stripe write, the old content of the to-be-written blocks and parity blocks may be read in order to calculate the new parity blocks, and then the new blocks and the parity blocks may be written. In another example, for a large partial stripe write, the untouched blocks (e.g., blocks that are not needed to be written) in the stripe may be read in order to calculate the new parity blocks, and then the new blocks and the new parity blocks may be written. For a full stripe write, however, the datastore may need to only calculate the new parity blocks (e.g., based on the new blocks that need to be written), and then write the new blocks and the new parity blocks. The datastore does not need to read any of the blocks and may only calculate the parity blocks for the to-be-written blocks, and then write all of the data blocks and the calculated parity blocks. Thus, a full stripe write may result in a lower write amplification compared to a small partial stripe write and a large partial stripe write. Lower write amplification may increase performance and lifespan of an SSD.

In some embodiments, zDOM sub-module 132 also performs other datastore procedures, such as data compression and hash calculation, which may result in substantial improvements, for example, in garbage collection, deduplication, snapshotting, etc. (some of which may be performed locally by LSOM sub-module 136 of FIG. 1).

Figure 2:
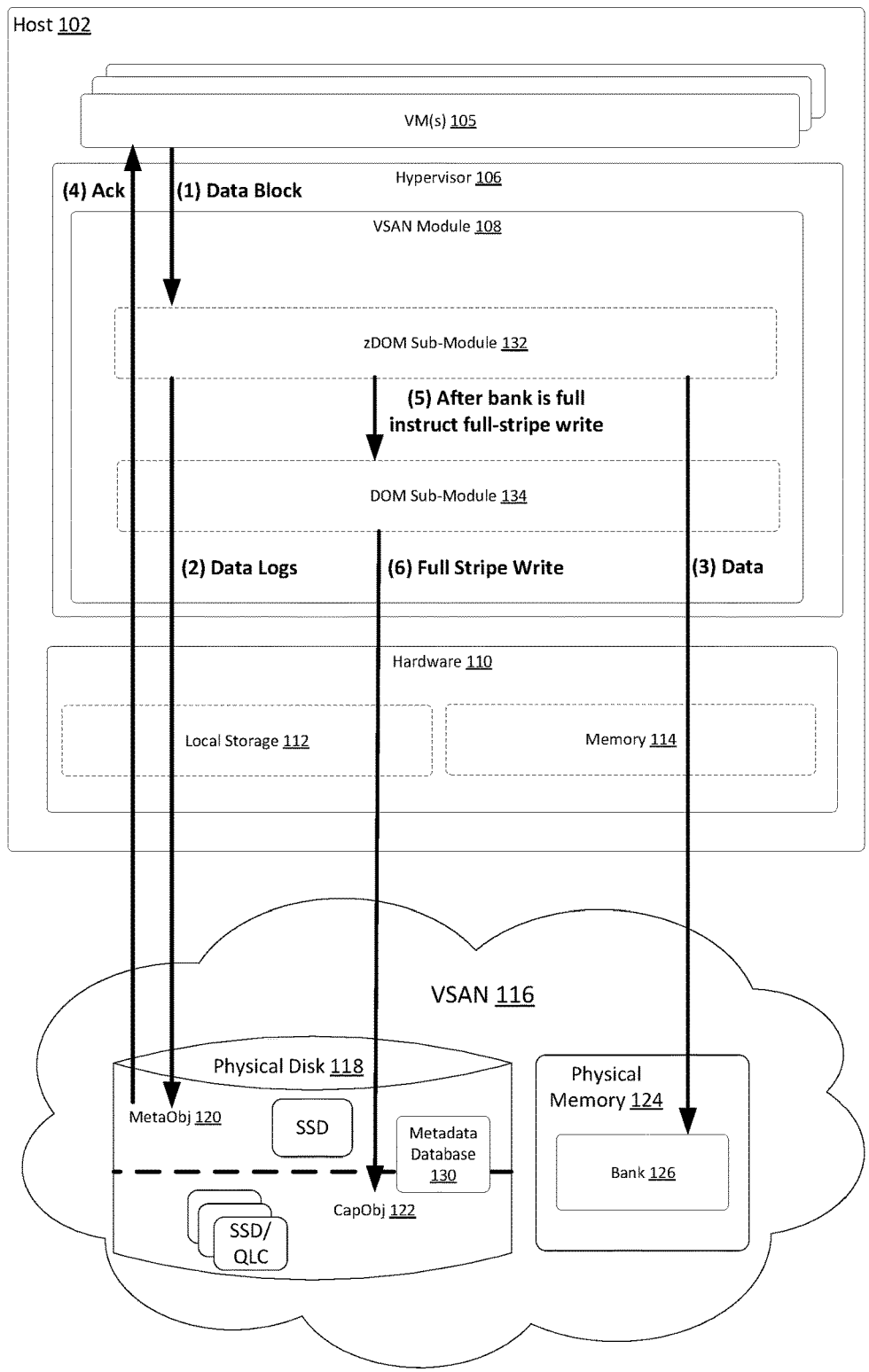
FIG. 2 is a diagram illustrating an embodiment in which a datastore module receives a data block and stores the data in the data block in different memory layers of a hosting system, according to an example embodiment of the present application.

FIG. 2 is a diagram illustrating an embodiment in which vSAN module 108 receives a data block and stores the data in the data block in different memory layers of vSAN 116, according to an example embodiment of the present application.

As shown in FIG. 2, at (1), zDOM sub-module 132 receives a data block from VM 105. At (2), zDOM sub-module 132 instructs DOM sub-module 134 to preliminarily store the data received from the higher layers (e.g., from VM 105) in a data log (e.g., MetaObj 120) of the performance tier of vSAN 116 and, at (3), in physical memory 124 (e.g., bank 126).

zDOM sub-module 132 may compress the data in the data block into a set of one or more sectors (e.g., each sector being 512-byte) of one or more physical disks (e.g., in the performance tier) that together store the data log. zDOM sub-module 132 may write the data blocks in a number of physical blocks (or sectors) and write metadata (e.g., the sectors' sizes, snapshot id, block numbers, checksum of blocks, transaction id, etc.) about the data blocks to the data log maintained in MetaObj 120. In some embodiments, the data log in MetaObj 120 includes a set of one or more records, each having a header and a payload for saving, respectively, the metadata and its associated set of data blocks. As shown in FIG. 2, after the data (e.g., the data blocks and their related metadata) is written to MetaObj 120 successfully, then at (4), an acknowledgement is sent to VM 105 letting VM 105 know that the received data block is successfully stored.

In some embodiments, when bank 126 is full (e.g., reaches a threshold capacity that satisfies a full stripe write), then at (5), zDOM sub-module 132 instructs DOM sub-module 134 to flush the data in bank 126 to perform a full stripe write to CapObj 122. At (6), DOM sub-module 134 writes the stored data in bank 126 sequentially on a full stripe (e.g., the whole segment or stripe) to CapObj 122 in physical disk 118.

zDOM sub-module 132 may further instruct DOM sub-module 134 to flush the data stored in bank 126 onto one or more disks (e.g., of one or more hosts 102) when the bank reaches a threshold size (e.g., a stripe size for a full stripe write). The data flushing may occur, while a new bank (not shown in FIG. 2) is allocated to accept new writes from zDOM sub-module 132. The number of banks may be indicative of how many concurrent writes may happen on a single MetaObj 120.

After flushing in-memory bank 126, zDOM sub-module 132 may release (or delete) the associated records of the flushed memory in the data log. This is because when the data stored in the bank is written to CapObj 122, the data is in fact stored on one or more physical disks (in the capacity tier) and there is no more need for storing (or keeping) the same data in the data log of MetaObj 120 (in the performance tier). Consequently, more free space may be created in the data log for receiving new data (e.g., from zDOM module 132).

In order to write full stripe (or full segment), vSAN module 108 may always write the data stored in bank 126 on sequential blocks of a stripe. As such, notwithstanding what the LBAs of a write are, the PBAs (e.g., on the physical disks) may always be continuous for the full stripe write.

Due to design issues and the limited number of writes allowed by memory cells of SSDs, an overwrite operation (e.g., a write for a data block referenced by an LBA that previously had written data associated with the LBA) may require that data previously associated with an LBA, for which new data is requested to be written, be erased before new content can be written (e.g., due to program/erase (P/E) cycles of the SSD). Erase operations may be block-wise. Therefore, data may be modified (i.e., written) only after the whole block to which it prior belonged is erased, which makes write operations significantly more costly than reads in terms of performance and energy consumption of the SSD. As is known in the art, a better alternative, as opposed to erasing a block each time new content is to be written for an LBA, may include marking an old block (containing the unchanged data) as "invalid" (e.g., not active) and then writing the new, changed data to an empty block. Invalid blocks may be garbage collected at a later time. While this may delay issuing erase operations thereby prolonging the lifespan of an SSD, stripes may become fragmented as the number of invalid blocks increases with each overwrite.

In order to provide clean stripes (e.g., segments) for zDOM sub-module 132 full stripe writes, segment cleaning may be introduced to recycle segments partially filled with "valid" blocks (e.g., active blocks) and move such valid block(s) to new location(s) (e.g., new stripe(s)). Segment cleaning consolidates fragmented free space to improve write efficiency. To free-up or clean selected segments, extents of the segments that contain valid data may be moved to different clean segments, and the selected segments (now clean) may be freed for subsequent reuse. Once a segment is cleaned and designated freed, data may be written sequentially to that segment. Selection of a clean segment to receive data (i.e., writes) from a segment being cleaned may be based, in some cases, upon an amount of free space (e.g., free blocks) remaining in the clean segment. Portions of data from the segment being cleaned may be moved to different "target" segments. That is, a plurality of relatively clean segments may receive differing portions of data from the segment(s) being cleaned.

Figure 3:
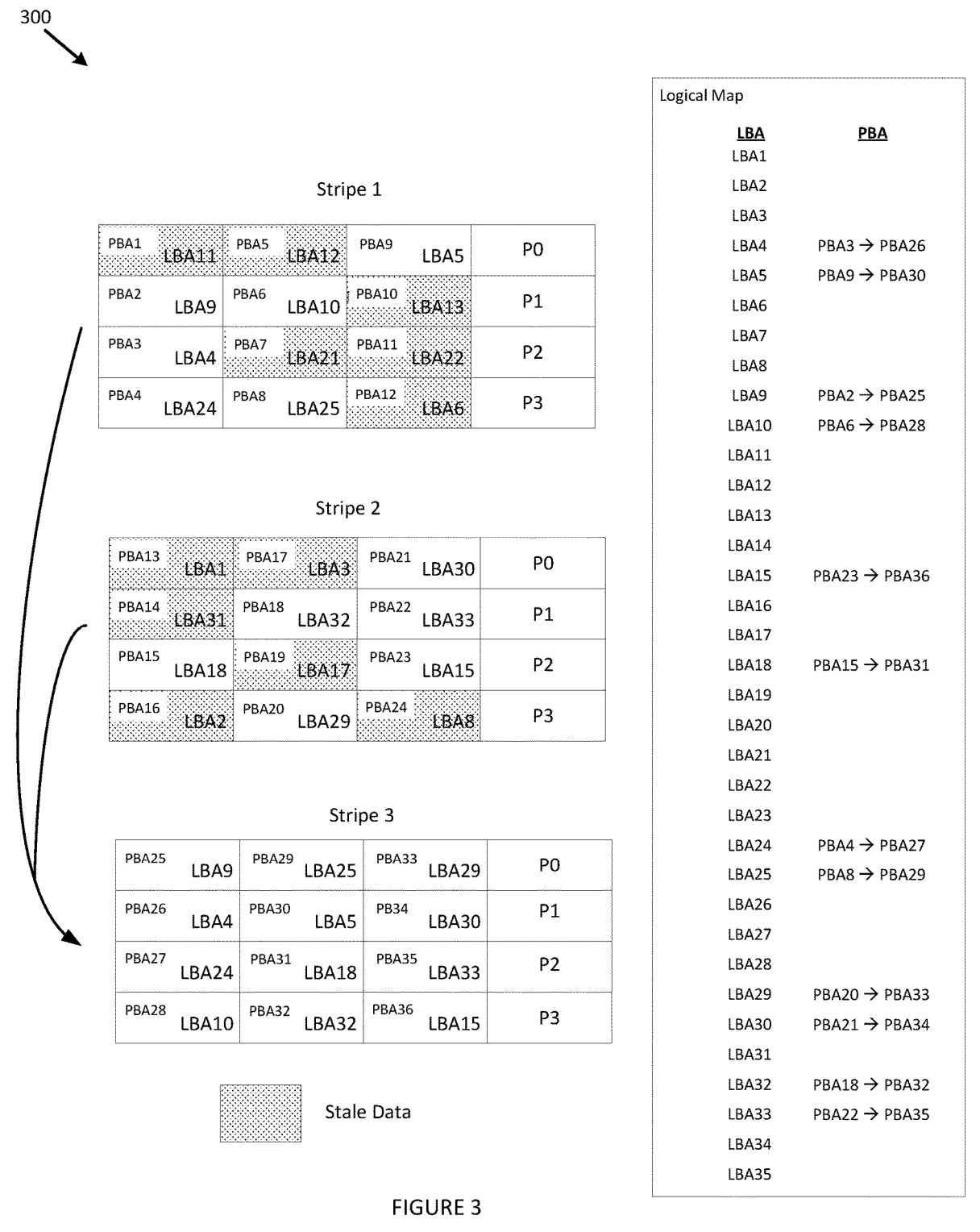

FIG. 3 is a diagram illustrating example segment cleaning used to consolidate active data blocks for full stripe writes, according to an example embodiment of the present disclosure. As shown in the example of FIG. 3, valid (e.g., active) data blocks from two stripes, Stripe 1 and Stripe 2, may be consolidated into another stripe, Stripe 3. As described above, the stripes may include invalid blocks, due to, for example, one or more overwrites of data for one or more LBAs. Stripe 1 may include data blocks associated with PBAs 1 through 12 and parity blocks P0 to P3 (based, at least in part, on the RAID configuration), stripe 2 may include data blocks associated with PBAs 13 through 24 and parity blocks P0 to P3, and stripe 3 may include data blocks associated with PBAs 25 through 36 and parity blocks P0 to P3. In the illustrated example, six blocks, associated with PBA2, PBA3, PBA4, PBA6, PBA8, and PBA9, are valid blocks in Stripe 1 while six blocks, associated with PBA1, PBA5, PBA7, PBA10, PBA11, and PBA12, are invalid blocks (shown as patterned blocks) containing stale data in Stripe 1. Similarly, six blocks, associated with PBA15, PBA18, PBA20, PBA21, PBA22, and PBA23, are valid blocks in Stripe 2 while six blocks, associated with PBA13, PBA14, PBA16, PBA17, PBA19, and PBA24, are invalid blocks (shown as patterned blocks) containing stale data in Stripe 2.

As shown, an extent map 142 can be stored and is accessible by vSAN module 108, for example, by the zDOM sub-module 132. The extent map 142 provides a mapping of LBAs to PBAs. Each physical block having a corresponding PBA in each of Stripes 1, 2 and 3 may be referenced by LBAs. For each LBA, the vSAN module 108, may store in a logical map, at least a corresponding PBA. The logical map may include an LBA to PBA mapping table. For example, the logical map may store tuples of <LBA, PBA>, where the LBA is the key. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key). In the example shown in FIG. 3, data previously written to a block in Stripe 1 corresponding to PBA2 is referenced by LBA9. Thus, the logical map may store a tuple of <LBA9, PBA2>. Similar tuples may be stored in the logical map for other LBAs in Stripes 1, 2, and 3. According to the information stored in the logical map, vSAN module 108 can use the logical map to determine which PBA is referenced by an LBA.

As discussed above, valid data blocks within each of Stripe 1 and Stripe 2 may be taken out of their respective stripes and consolidated into one stripe, Stripe 3. Therefore, one full stripe may be produced as a result. Stripe consolidation may include reading the data blocks of Stripe 1 and Stripe 2, identifying only valid blocks within each of Stripe 1 and Stripe 2, and moving the identified valid data blocks into a write buffer. The contents of the logical map may be updated to indicate proper disk locations. For example, as shown in FIG. 3, data block contents of LBA9, LBA4, LBA24, LBA10, LBA25, and LBA5 may be collectively written to blocks of Stripe 3, wherein the blocks of Stripe 3 correspond to PBA25-PBA36. Similarly, data block contents of LBA18, LBA32, LBA29, LBA30, LBA33, and LBA15 may be collectively written to blocks PBA25-PBA36 of Stripe 3. The original PBAs corresponding to the LBAs written to Stripe 3 may be marked "stale" or "invalid" following completion of the write of data to Stripe 3. Additionally, the logical map may be updated to reflect the changes of the PBAs mapped to the LBAs. For example, for the LBA9, the tuple may be updated from <LBA9, PBA2> to <LBA9, PBA25>, and the physical addresses corresponding to LBA4, LBA24, LBA10, LBA25, LBA5, LBA18, LBA32, LBA29, LBA30, LBA33, and LBA15 may be updated similarly.

The dynamic relocation of valid (e.g., active) blocks to new locations may not only trigger updates to the logical map but also to a snapshot mapping architecture. Modern storage platforms, including vSAN 116, may enable snapshot features for backup, archival, or data protections purposes. Snapshots provide the ability to capture a point-in-time state and data of a VM 105 to not only allow data to be recovered in the event of failure but restored to known working points. Snapshots may capture VMs' 105 storage, memory, and other devices, such as virtual network interface cards (NICs), at a given point in time. Snapshots do not require an initial copy, as they are not stored as physical copies of data blocks, but rather as pointers to the data blocks that existed when the snapshot was created. Because of this physical relationship, a snapshot may be maintained on the same storage array as the original data.

Each snapshot may include its own logical map. Where a logical map has not been updated from the time a first snapshot was taken to a time a subsequent snapshot was taken, snapshot logical maps may include identical tuples for the same LBA. As more snapshots are accumulated over time (i.e., increasing the number of snapshot logical maps), the number of references to the same PBA extent may increase.

Given the snapshot mapping architecture, dynamic relocation of valid (e.g., active) blocks to new locations during segment cleaning may introduce severe I/O overhead. For example, numerous metadata write I/Os at the snapshot logical maps needed to update the PBA for LBA(s) of multiple snapshots may result in poor snapshot performance at vSAN 116. As an illustrative example, where there are five snapshot logical maps and each snapshot logical map includes a tuple for a first LBA (e.g., <LBA1, PBA1>), if segment cleaning causes data block content associated with LBA1 to be relocated from PBA1 to PBA5, then five snapshot logical maps may need to be updated to reflect this change in location (e.g., update five snapshot logical maps from <LBA1, PBA1> to <LBA1, PBA5>) which may have adverse effects on snapshot performance.

Aspects of the present disclosure introduce a two-layer snapshot extent mapping architecture including a middle map to address the problem of I/O overhead when dynamically relocating physical data blocks. The extent map 142 may map LBAs of a snapshot extent to an MBA of a middle map, where the MBA maps to one or more PBAs. The extent map 142 may be stored within in-memory metadata database 128 (as shown in FIG. 1 and described herein) as well as in persistent storage on the physical disk 118.

Figure 4:
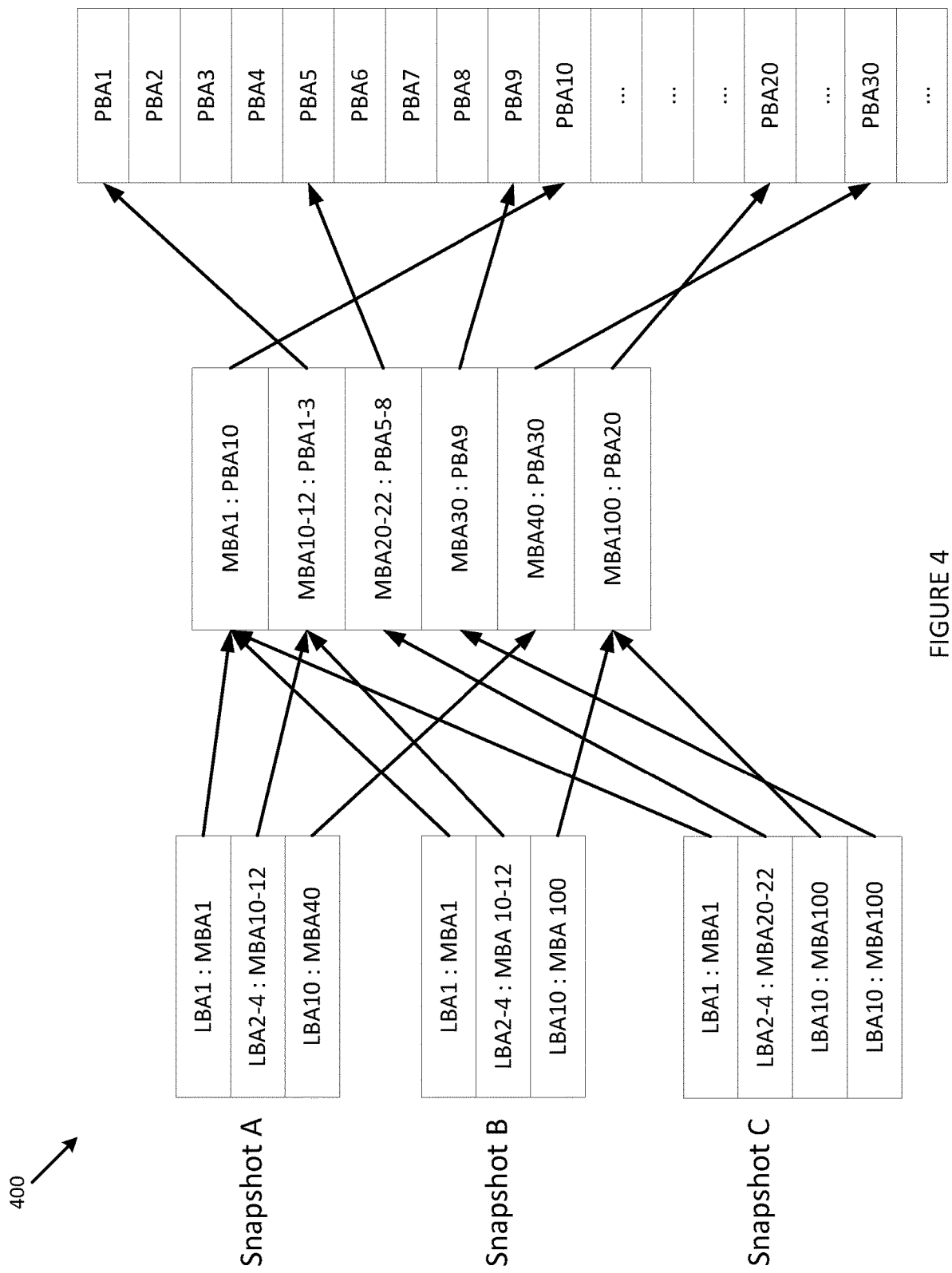
FIG. 4 is a diagram illustrating example two-layer snapshot extent mapping architecture, according to an example embodiment of the present disclosure.

FIG. 4 is a diagram illustrating an example two-layer snapshot extent mapping, according to an example embodiment of the present disclosure. As shown in FIG. 4, the first layer of the two-layer snapshot extent mapping architecture may include a snapshot logical map. The schema of the snapshot logical map may store a one tuple key <LBA> to a two-tuple value <MBA, numBlocks>. In some embodiments, other tuple values, such as a number of sectors, compression size, etc. may also be stored in the snapshot logical map. Because a middle map extent may refer to a number of contiguous blocks, value "numBlocks" may indicate a number of uncompressed contiguous middle map blocks for which the data is stored within.

The second layer of the two-layer snapshot extent mapping architecture includes a middle map responsible for maintaining a mapping between MBA(s) and PBA(s) (or physical sector address(es) (PSA(s)) of one or more sectors (e.g., each sector being 512-byte) of a physical block where blocks are compressed prior to storage). Accordingly, the schema of the middle map may store a one tuple key <MBA> and a two-tuple value <PBA, numBlocks>. Value "numBlocks" may indicate a number of contiguous blocks starting at the indicated PBA. Any subsequent overwrite may break the PBA contiguousness in the middle map extent, in which case an extent split may be triggered.

In certain embodiments, each physical block may be subdivided into a number of sectors (e.g., eight sectors). Accordingly, in certain embodiments each compressed data block may be stored in one or more sectors (e.g., each sector being 512 bytes) of a physical block. In such cases, the schema of the middle map may store a one tuple key <MBA> and a four-tuple value <PSA, numBlocks, numSectors, compression size>. In some embodiments, other tuple values, such as cyclic redundancy check (CRC), may also be stored in the middle map.

In the example of FIG. 4, LBA1 of snapshot A, LBA1 of snapshot B, and LBA1 of snapshot C all map to PBA10. Instead of mapping each of these references to the same PBA, a middle map extent may be created, and each reference points to the middle map extent specific for PBA10 (e.g., MBA1). In this case, LBA1 of snapshot A may be stored in snapshot logical map A as a tuple of <LBA1, MBA1>, LBA1 of snapshot B may be stored in snapshot logical map B as a tuple of <LBA1, MBA1>, and LBA1 of snapshot C may be stored in snapshot logical map C as a tuple of <LBA1, MBA1>. At the middle map, a tuple of <MBA1, PBA10> may be stored.

Accordingly, if data block content referenced by LBA1 of Snapshots A, B, and C is moved from PBA10 to another PBA, for example, PBA25, due to segment cleaning for full stripe write, only the single extent at the middle map can be updated to reflect the change of the PBA for all of the LBAs which reference that data block. This two-layer architecture reduces I/O overhead by not requiring the system to update multiple references to the same PBA extent at different snapshot logical maps. Additionally, the proposed two-layer snapshot extent architecture removes the need to keep another data structure to find all snapshot logical map pointers pointing to a middle map.

Figure 5:
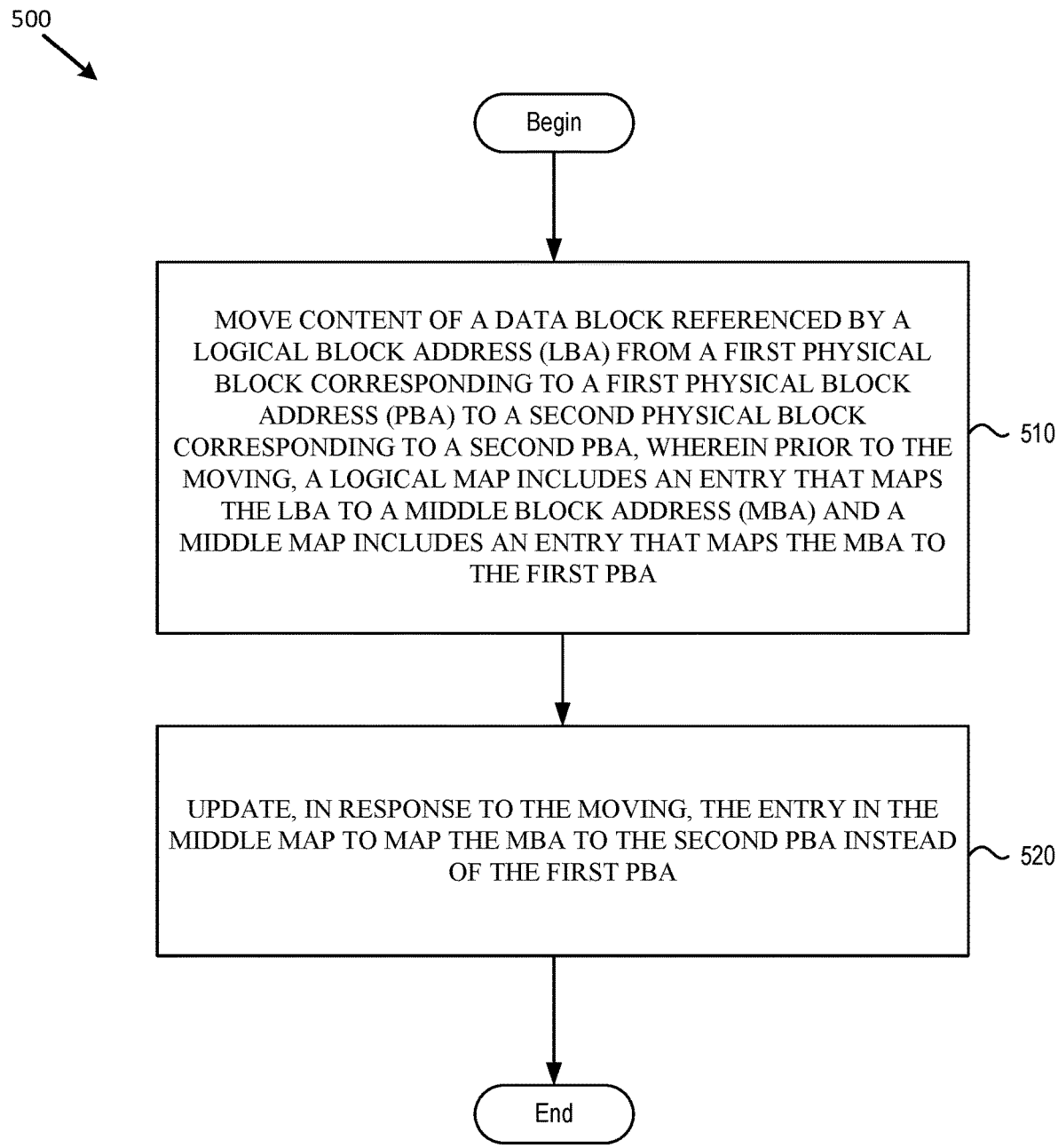
FIG. 5 is a flowchart illustrating a method for creating a two-layer snapshot extent mapping architecture, according to an example embodiment of the present application.

FIG. 5 is a flowchart illustrating a method (or process) 500 for block addressing, according to an example embodiment of the present application. The method 500 may be performed by a module such as vSAN module 108. In some other embodiments, the method may be performed by other modules that reside in hypervisor 106 or outside of hypervisor 106.

Process 500 may start, at 510, by vSAN module 108 moving content of a data block referenced by a LBA from a first physical block corresponding to a first PBA to a second physical block corresponding to a second PBA, wherein prior to the moving a logical map maps the LBA to a MBA and a middle map maps the MBA to the first PBA.

In some embodiments, a plurality of logical maps map the LBA to the MBA prior to the moving, and wherein a state of each of the plurality of logical maps is maintained in response to the moving. Each of the plurality of logical maps may be associated with a corresponding snapshot of a plurality of snapshots.

In some embodiments, an entry associated with the LBA in a table of the logical map includes an indication of the MBA associated with the LBA and an indication of a number of data blocks associated with the LBA. In some embodiments, an entry associated with the MBA in a table of the middle map includes an indication of the first PBA or the second PBA and an indication of a number of blocks associated with the MBA.

In some embodiments, moving the content of the data block to the second physical block may include compressing the data of the block to generate compressed data and storing the compressed data in one or more sectors of the second physical block, wherein each sector corresponds to a PSA. An entry associated with the MBA in a table of the middle map may include an indication of a PSA having a lowest value among the PSAs corresponding to each of the one or more sectors, an indication of a number of blocks associated with the MBA, a number of sectors storing the compressed data, and a compression size of the compressed data.

In some embodiments, the first physical block and the second physical block are in a data log of at least one physical disk in a set of one or more physical disks of a set of one or more host machines. In some embodiments, moving content of the data block is based, at least in part, on a segment cleaning to cause the size of the data log to satisfy a threshold size. The threshold size may include a number of data blocks corresponding to a full stripe, wherein the data blocks are spread across the set of one or more physical disks of the set of one or more host machines.

At 520, in response to the moving, vSAN module 108 updates the middle map to map the MBA to the second PBA instead of the first PBA.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for block addressing, comprising:
    moving content of a data block referenced by a logical block address (LBA) from a first physical block corresponding to a first physical block address (PBA) to a second physical block corresponding to a second PBA, wherein:
        prior to the moving, each of a plurality of logical maps includes a same entry that maps the LBA to a middle block address (MBA) and a middle map includes an entry that maps the MBA to the first PBA, and
        moving the content of the data block to the second physical block comprises:
            compressing the content of the data block to generate compressed content and
            storing the compressed content in one or more sectors of the second physical block, wherein each sector corresponds to a physical sector address (PSA); and
    in response to the moving, updating the entry in the middle map to map the MBA to the second PBA instead of the first PBA, wherein the entry associated with the MBA in the middle map includes an indication of a PSA having a lowest address value among the PSAs corresponding to each of the one or more sectors, an indication of a number of blocks associated with the MBA, an indication of a number of sectors storing the compressed content, and an indication of a compression size of the compressed content.

2. The method of claim 1, wherein the entry in each of the plurality of logical maps is unchanged in response to the moving.

3. The method of claim 1, wherein the entry associated with the LBA in each of the plurality of logical maps includes an indication of the MBA associated with the LBA.

4. The method of claim 1, wherein, prior to the moving, the entry associated with the MBA in the middle map includes an indication of the first PBA and the indication of the number of blocks associated with the MBA.

5. The method of claim 1, wherein the first physical block and the second physical block are in a data log of at least one physical disk in a set of one or more physical disks of a set of one or more host machines.

6. A system comprising:
    one or more processors; and
    at least one memory, the one or more processors and the at least one memory configured to:
        move content of a data block referenced by a logical block address (LBA) from a first physical block corresponding to a first physical block address (PBA) to a second physical block corresponding to a second PBA, wherein:
            prior to the moving, each of a plurality of logical maps includes a same entry that maps the LBA to a middle block address (MBA) and a middle map includes an entry that maps the MBA to the first PBA, and
            moving the content of the data block to the second physical block comprises:
                compressing the content of the data block to generate compressed content and
                storing the compressed content in one or more sectors of the second physical block, wherein each sector corresponds to a physical sector address (PSA); and
        in response to the moving, update the entry in the middle map to map the MBA to the second PBA instead of the first PBA, wherein the entry associated with the MBA in the middle map includes an indication of a PSA having a lowest address value among the PSAs corresponding to each of the one or more sectors, an indication of a number of blocks associated with the MBA, an indication of a number of sectors storing the compressed content, and an indication of a compression size of the compressed content.

7. The system of claim 6, wherein the entry in each of the plurality of logical maps is unchanged in response to the moving.

8. The system of claim 6, wherein the entry associated with the LBA in each of the plurality of logical maps includes an indication of the MBA associated with the LBA.

9. The system of claim 6, wherein, prior to the moving, the entry associated with the MBA in the middle map includes an indication of the first PBA and the indication of the number of blocks associated with the MBA.

10. The system of claim 6, wherein the first physical block and the second physical block are in a data log of at least one physical disk in a set of one or more physical disks of a set of one or more host machines.

11. A non-transitory computer readable medium comprising instructions that, when executed by one or more processors of a computing system, cause the computing system to perform operations for block addressing, the operations comprising:

moving content of a data block referenced by a logical block address (LBA) from a first physical block corresponding to a first physical block address (PBA) to a second physical block corresponding to a second PBA, wherein:

prior to the moving, each of a plurality of logical maps includes a same entry that maps the LBA to a middle block address (MBA) and a middle map includes an entry that maps the MBA to the first PBA, and moving the content of the data block to the second physical block comprises:

compressing the content of the data block to generate compressed content and storing the compressed content in one or more sectors of the second physical block, wherein each sector corresponds to a physical sector address (PSA); and in response to the moving, updating the entry in the middle map to map the MBA to the second PBA instead of the first PBA, wherein the entry associated with the MBA in the middle map includes an indication of a PSA having a lowest address value among the PSAs corresponding to each of the one or more sectors, an indication of a number of blocks associated with the MBA, an indication of a number of sectors storing the compressed content, and an indication of a compression size of the compressed content.

12. The non-transitory computer readable medium of claim 11, wherein the entry in each of the plurality of logical maps is unchanged in response to the moving.

13. The non-transitory computer readable medium of claim 11, wherein the entry associated with the LBA in each of the plurality of logical maps includes an indication of the MBA associated with the LBA.

14. The non-transitory computer readable medium of claim 11, wherein, prior to the moving, the entry associated with the MBA in the middle map includes an indication of the first PBA or the second PBA and the indication of the number of blocks associated with the MBA.

\* \* \* \* \*